No. 625,632. Patented May 23, 1899.
W. W. ADAMS & H. McGEORGE.
ELECTRIC CONTROLLER.
(Application filed Oct. 17, 1898.)
(No Model.) 2 Sheets—Sheet 1.
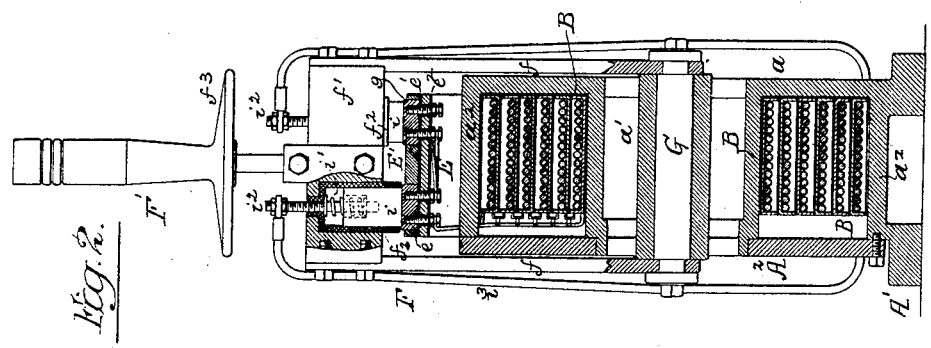
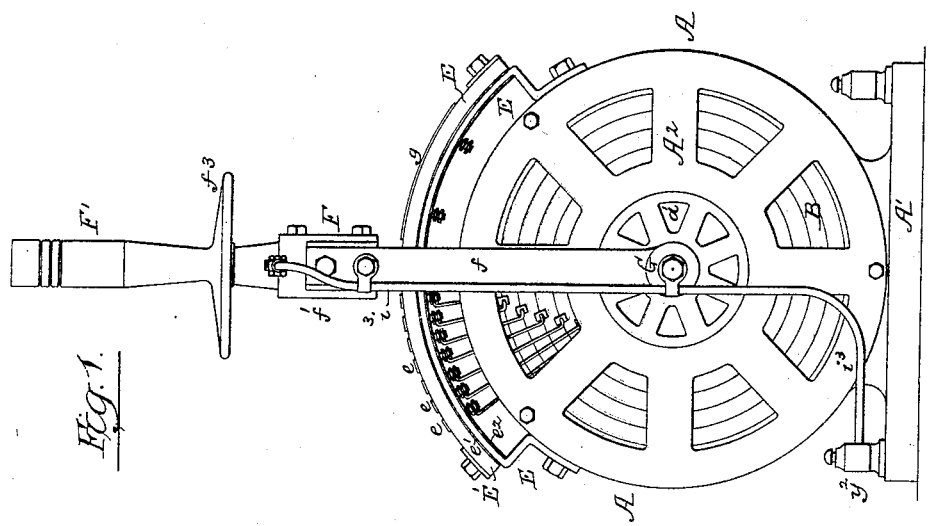
Witnesses:—
Frank L. A. Graham
Louis M. F. Whitehead
Inventors:
William W. Adams
Harold McGeorge
by their Attorneys
Howsen & Howsen No. 625,632. Patented May 23, 1899.
W. W. ADAMS & H. McGEORGE.
ELECTRIC CONTROLLER.
(Application filed Oct. 17, 1898.)

(No Model.) 2 Sheets—Sheet 2.

Witnesses:
Frank La. Graham
Louis W. H. Whitehead

Inventors:
William W. Adams
Harold McGeorge
by their Attorneys
Howson & Howson

UNITED STATES PATENT OFFICE.

WILLIAM W. ADAMS AND HAROLD McGEORGE, OF CLEVELAND, OHIO, ASSIGNORS TO THE ELECTRIC CONTROLLER AND SUPPLY CO., OF SAME PLACE.

ELECTRIC CONTROLLER.

SPECIFICATION forming part of Letters Patent No. 625,632, dated May 23, 1899.

Application filed October 17, 1898. Serial No. 693,769. (No model.)

*To all whom it may concern:*

Be it known that we, WILLIAM W. ADAMS and HAROLD McGEORGE, citizens of the United States, and residents of Cleveland, Ohio, have invented certain Improvements in Electrical Controllers, of which the following is a specification.

The object of our invention is to so construct an electrical controller that it will be compact in form and the parts readily accessible for examination and repairs. This object we attain in the following manner, reference being had to the accompanying drawings, in which—

Figure 3:
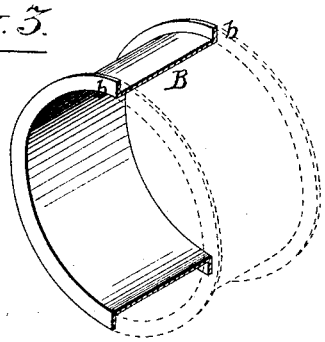
Figure 5:
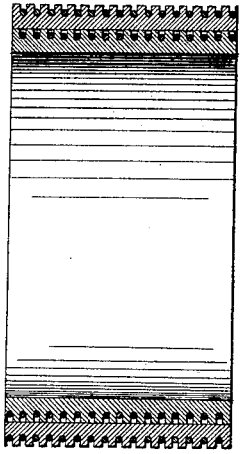
Figure 4:
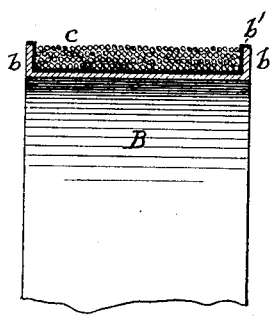
Figure 6:
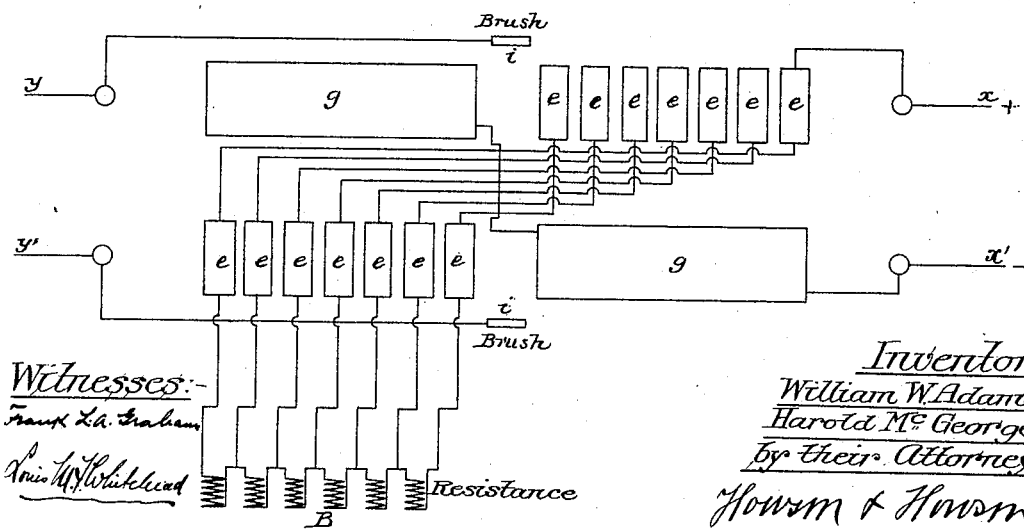

Figure 1 is a side view of our improved electrical controller. Fig. 2 is a transverse sectional view. Fig. 3 is a detached sectional perspective view of one of the spools. Fig. 4 is an enlarged sectional view of a portion of one of the spools with a wire thereon. Fig. 5 is a sectional view showing a modification of one of the spools, and Fig. 6 is a diagram of the wiring.

The controller of the type shown is adapted to be used to regulate and reverse the speed of an electric motor by inserting in the circuit a variable resistance. In the diagram, Fig. 6, the wires $x$ $x'$ lead from the supply and the wires $y$ $y'$ lead to the armature connections of the motor. The two sets of detached contact-plates are coupled to the resistance-spools, as shown, so that when the brushes are in the central position they are out of contact and when they are moved in one direction they are in contact with the plate having the greatest resistance, and as they are gradually moved toward the end the resistance decreases. When it is wished to reverse the motor the brushes are moved to the opposite side.

Referring now to Figs. 1 and 2, A is the frame of the controller, mounted on a suitable base A', and it will be noticed that the frame, in referring to Fig. 2, is made of a solid back $a$, a hub $a'$, and a peripheral flange $a^2$. Attached to the front of the casing is a cap $A^2$. Mounted on the hub $a'$ are a series of spools B. (Shown more clearly in Figs. 3 and 4.) The spools are of different diameters, so that the first spool will slip onto the hub and the others will be mounted one upon another until the space between the hub and the peripheral flange $a^2$ is filled. The cap-plate $A^2$ incloses the spools. The spools are preferably made of sheet-iron and have flanges $b$ $b$ at each end and a lining $b'$, of porcelain. In some instances the spools may be coated entirely with porcelain or other suitable non-conducting material. The resistance-wires, of any desired section, are wound upon these spools, as shown in Fig. 4, and the wires of the several spools are coupled together and to their respective plates $e$ on the segmental bridge E. The plates rest in the segments $e'$ on the bridge and are insulated from the bridge by insulating material $e^2$, as shown in Fig. 2.

Mounted in the hub $a'$ is a shaft G, on the trunnions of which is pivoted the brush-holder F, having two arms $f f$, which support the cross-head $f'$. The cross-head carries the brushes $i$ $i$, which are adapted to sockets in the cross-head, and insulating material $f^2$ is inserted between the brushes and the cross-head, as clearly illustrated in Fig. 2.

There are two brushes $i$ $i$ carried by the head, one adapted to bear upon the sectional contacts $e$ and the other upon a continuous contact $g$ alongside of said sectional contacts, as shown clearly in Fig. 2 and in the diagram, Fig. 6, and each brush is forced down onto the contact-plates by a spring $i'$. Extending from each brush is a binding-post $i^2$, to which are connected the wires $i^3$, leading to the armature binding-posts $y^2$. The wire is attached at or near the pivot of the brush-holder F, so that the wire will simply yield when the brush-holder is moved, thus dispensing with sliding contacts at this point.

The brush-holder is provided with a handle F', having an enlarged flange $f^3$, which prevents the hand from coming in contact with the binding-posts of the brushes.

In some instances instead of making the spools, as shown in Figs. 3 and 4, of sheet-iron they may be made entirely of porcelain, having either the cross-section shown in Fig. 3 or that shown in Fig. 5, in which case the periphery of each spool has a spiral groove adapted to receive the resistance-wire, which may be simply plain uncovered wire.

It will be seen by the above description that we can make a very compact and easily-accessible controller which can be cheaply manufactured and readily assembled.

We claim as our invention—

1. The combination in a controller, of the casing having a hub, a series of concentric spools, a segmental bridge mounted on the casing and carrying contact-plates, and a brush-holder having brushes adapted to move over the surface of the plates, substantially as described.

2. The combination in a controller, of a frame having a hub and a peripheral flange, a series of flanged rings forming spools for the resistance-wire, said rings being nested together and mounted between the hub and peripheral flange of the casing, a segmental bridge, contact-plates carried by said bridge and connected to the resistance-wire on the several rings, a brush-holder and brush carried thereby adapted to travel over the plates on the bridge, substantially as described.

3. The combination in a controller, of a frame, resistance-wire mounted therein, a segmental bridge-piece mounted on the frame and having two sets of contact-plates arranged side by side, a brush-holder pivoted to the frame and having two brushes, one adapted to one set of plates and the other adapted to the other set, two flexible wires, one on each side of the controller, one attached to one brush and to a fixed binding-post and the other attached to another brush and to another fixed binding-post, substantially as described.

4. The combination of the casing, a series of rings nested in said casing, resistance material carried by said rings, a bridge-piece, contact-plates mounted on the bridge-piece and connected to a wire, a brush-holder pivoted to the center of the casing and brushes carried by said holder, substantially as described.

5. The combination of the casing, a series of concentric rings mounted in the casing, resistance material mounted on said rings, a bridge-piece, contact-plates on said bridge-piece connected to the resistance material, a brush-carrier pivoted to the center of the frame, brushes carried by said frame, wires extending from the brushes to binding-posts and attached at or near the pivot-point of the brush-holder, substantially as described.

6. The combination in a controller, of the casing having a hub and peripheral flange, a series of rings nested one within another between the hub and the flange of the casing, each ring having side flanges and being porcelain-lined, resistance-wire mounted upon the several rings or spools, contact-plates and brush-carrier and brushes, substantially as described.

7. The combination in a controller, of the frame, spools mounted thereon, resistance material mounted on the spools, contact-plates connected to the said resistance material, a pivoted brush-carrier having insulated sockets extending to a point near the surface of the fixed contact-plates, and sliding brushes adapted to the insulated sockets, substantially as described.

8. The combination of a frame, having a hub and a peripheral flange, a series of rings nested together between the hub and the peripheral flange, a cap secured to the casing and inclosing the spools, a bridge-piece, contact-plates mounted on the bridge-piece but insulated therefrom and connected to the resistance material on the several spools, a brush-holder pivoted at the center of the hub and made up of two arms and a cross-head, said cross-head having insulated sockets, a brush in each socket, a spring in each socket adapted to force the brush down onto the contact-plates, a binding-post extending from each brush and connected to a wire leading to a point at or near the pivot of the brush-holder and connected to the armature binding-posts, and a handle by which the brush-holder is operated, substantially as described.

In testimony whereof we have signed our names to this specification in the presence of two subscribing witnesses.

WILLIAM W. ADAMS.
HAROLD McGEORGE.

Witnesses:
JAS. McGEORGE,
JAS. M. WIGHT.